US008751625B2

(12) United States Patent
Suzuki et al.

(10) Patent No.: US 8,751,625 B2
(45) Date of Patent: Jun. 10, 2014

(54) NOTIFICATION APPARATUS AND NOTIFICATION METHOD

(75) Inventors: Naohiko Suzuki, Tokyo (JP); Kensuke Yasuma, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 213 days.

(21) Appl. No.: 11/948,034

(22) Filed: Nov. 30, 2007

(65) Prior Publication Data

US 2008/0133710 A1    Jun. 5, 2008

(30) Foreign Application Priority Data

Dec. 4, 2006  (JP) ................. 2006-327027
Aug. 2, 2007  (JP) ................. 2007-201791

(51) Int. Cl.
| G06F 15/173 | (2006.01) |
| G06F 15/16 | (2006.01) |
| H04L 29/06 | (2006.01) |
| H04L 12/28 | (2006.01) |
| G06F 21/30 | (2013.01) |

(52) U.S. Cl.
CPC ............ H04L 63/10 (2013.01); *H04L 63/20* (2013.01); *H04L 63/0876* (2013.01); *H04L 12/2858* (2013.01); *G06F 21/305* (2013.01)
USPC ........................... 709/224; 709/225; 709/229

(58) Field of Classification Search
USPC ........................................................ 709/224
See application file for complete search history.

(56) References Cited

U.S. PATENT DOCUMENTS

| 5,699,513 | A  | * | 12/1997 | Feigen et al. ............... 726/11 |
| 6,049,834 | A  | * | 4/2000  | Khabardar et al. .......... 709/242 |
| 6,092,191 | A  | * | 7/2000  | Shimbo et al. .............. 713/153 |
| 6,393,484 | B1 | * | 5/2002  | Massarani .................... 709/227 |
| 6,910,074 | B1 | * | 6/2005  | Amin et al. .................. 709/227 |
| 7,197,035 | B2 | * | 3/2007  | Asano .......................... 370/392 |
| 7,801,123 | B2 | * | 9/2010  | Dharanikota et al. ....... 370/389 |
| 2001/0046223 | A1 | * | 11/2001 | Malki et al. .................. 370/338 |
| 2002/0075844 | A1 | * | 6/2002  | Hagen ........................... 370/351 |
| 2002/0107961 | A1 | * | 8/2002  | Kinoshita .................... 709/225 |
| 2002/0181395 | A1 | * | 12/2002 | Foster et al. ................. 370/229 |
| 2003/0135596 | A1 | * | 7/2003  | Moyer et al. ................. 709/223 |
| 2004/0004967 | A1 | * | 1/2004  | Nakatsugawa et al. ..... 370/400 |
| 2004/0019696 | A1 | * | 1/2004  | Scott et al. ................... 709/242 |
| 2004/0133687 | A1 | * | 7/2004  | Yamaguchi et al. ......... 709/228 |
| 2004/0170151 | A1 | * | 9/2004  | Habetha ........................ 370/338 |
| 2005/0089034 | A1 | * | 4/2005  | Sakata et al. ................. 370/389 |
| 2005/0165953 | A1 | * | 7/2005  | Oba et al. .................... 709/238 |
| 2005/0190734 | A1 | * | 9/2005  | Khalil et al. ................. 370/338 |
| 2005/0190765 | A1 | * | 9/2005  | Gotoh et al. ................. 370/390 |
| 2006/0077906 | A1 | * | 4/2006  | Maegawa et al. ............ 370/254 |
| 2006/0077932 | A1 | * | 4/2006  | Takeda et al. ................ 370/331 |
| 2006/0126661 | A1 | * | 6/2006  | Zheng et al. ................. 370/469 |
| 2006/0171370 | A1 | * | 8/2006  | Matsumoto et al. ......... 370/351 |
| 2009/0063706 | A1 | * | 3/2009  | Goldman et al. ............ 709/250 |

FOREIGN PATENT DOCUMENTS

| JP | 05-056080 A | 3/1993 |
| JP | 2003-78952 A | 3/2003 |

* cited by examiner

*Primary Examiner* — Ario Etienne
*Assistant Examiner* — Blake Rubin
(74) *Attorney, Agent, or Firm* — Canon U.S.A., Inc. IP Division

(57) ABSTRACT

A notification apparatus includes a notification unit configured to notify a connected network of routing information, and a restriction unit configured to restrict notification of the routing information when a connected network is not a registered network.

23 Claims, 8 Drawing Sheets

FIG. 6

| MAC ADDRESS OF ROUTER | IP ADDRESS OF ROUTER | NETWORK UNIT IDENTIFICATION INFORMATION | CONTROL LEVEL |
|---|---|---|---|
| 11:22:33:44:55:66 | 192.168.12.1 | 255.255.255.0 | 1 |
| 12:34:56:78:90:ab | 150.61.123.1 | 255.255.0.0 | 2 |
| aa:bb:cc:dd:ee:ff | 2001:12aa:34bb::1 | 2001:12aa:34bb/64 | 3 |

FIG. 8

| INTERFACE NAME | ADDRESS | NETWORK UNIT IDENTIFICATION INFORMATION | CONNECTION DESTINATION |
|---|---|---|---|
| eth0 | 192.168.12.11 | 255.255.255.0 | PHYSICAL NETWORK |
| tap0 | - | - | PHYSICAL NETWORK 2 |
| tap1 | - | - | PHYSICAL NETWORK 1 |

NOTIFICATION APPARATUS AND NOTIFICATION METHOD

BACKGROUND OF THE INVENTION

1. Field of the Invention

The present invention relates to a notification apparatus and a notification method.

2. Description of the Related Art

A conventional apparatus having a function of controlling a route on a network releases routing control information to the public. Further, there is an apparatus having a function of providing network setting information on a network.

Japanese Patent Application Laid-Open No. 05-056080 discusses a technology which adds network tree topology information to a packet format and updates old routing control information so as to transmit correct routing control information to a network system.

According to a technology discussed in Japanese Patent Application Laid-Open No. 2003-78952, when a user selects a function of a portable terminal at a certain place, the apparatus executes the selected function if the user has used it before around the place. However, the apparatus requires the user to input a password, etc., if the user has not used the selected function before around the place.

However, an electronic apparatus not only operates as a network node but also includes a function of performing routing control. Such an electronic apparatus can be connected to a network different from previous one owing to a user's movement, or a route change can occur with respect to an upstream side network. In such a case, a problem may arise.

That is, when an apparatus moves and changes a network, a network topology change occurs. However, if a connected routing control apparatus detects the change and only advertises new routing control information on a network, the apparatus can advertise incorrect routing control information and destroy an Internet connection environment at a movement destination or on a home network.

SUMMARY OF THE INVENTION

The present invention is directed to restricting or prohibiting a notification of routing information or information used in a communication with a second network.

According to an aspect of the present invention, a notification apparatus includes a notification unit configured to notify a connected network of routing information, and a restriction unit configured to restrict notification of the routing information when the connected network is not a registered network.

According to another aspect of the present invention, a notification apparatus includes a notification unit configured to notify a first network of information used in a communication with a second network, and a restriction unit configured to restrict notification by the notification unit when the apparatus cannot communicate with the second network.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates network information and control level information according to an exemplary embodiment of the present invention.

FIG. 8 is a view collectively illustrating an interface name and network information.

DETAILED DESCRIPTION OF THE EMBODIMENTS

Various exemplary embodiments, features, and aspects of the invention will be described below with reference to the drawings.

Figure 1:
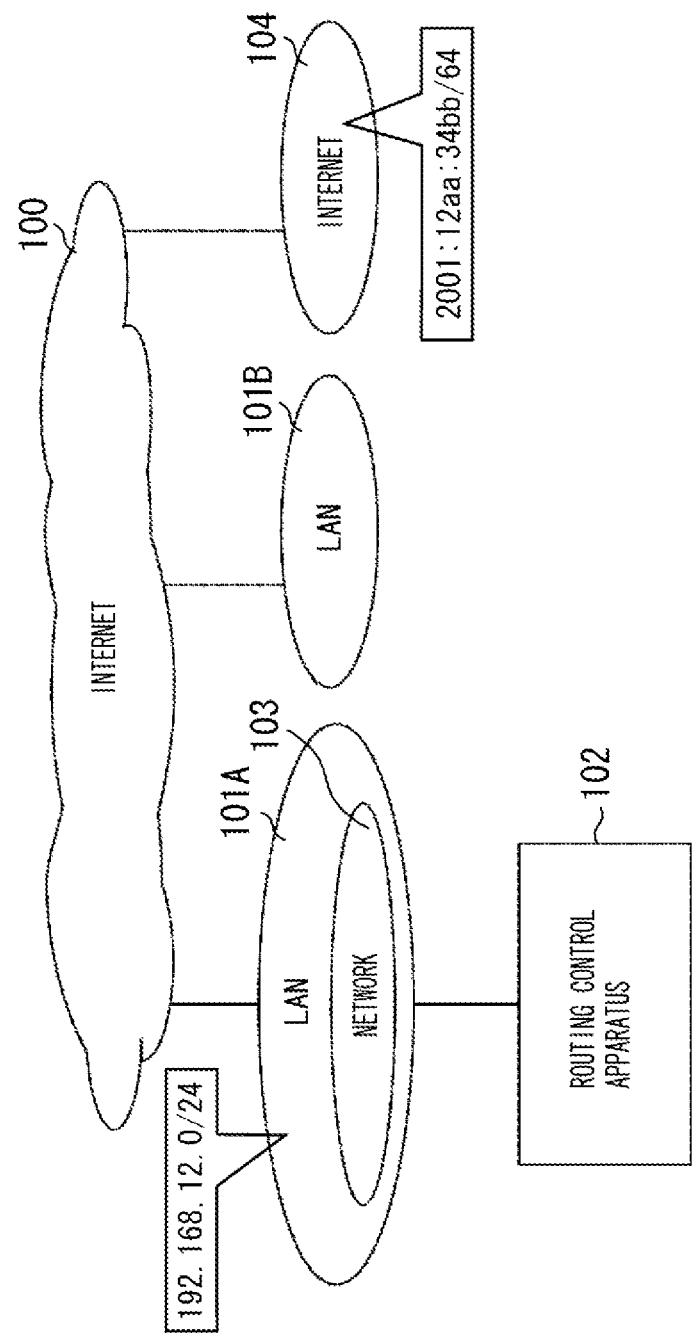
FIG. 1 illustrates a network configuration according to an exemplary embodiment of the present invention.

FIG. 1 illustrates a network configuration according to an exemplary embodiment of the present invention. In FIG. 1, an Internet 100 can be implemented by a single Wide Area Network (WAN), Local Area Network (LAN) and ad hoc network. Further, the Internet 100 can be configured of a plurality of WAN, LAN and ad hoc networks as necessary. The Internet in the present embodiment is one example, and other communication network or a combination of communication networks can be used.

LAN 101A and 101B are physical networks and connected to the Internet. LAN in the present embodiment is one example, and other communication network or a combination of communication networks can be used.

A logical network 103 is logically distinguished from LAN. The logical network 103 can logically connect to a logical network 104. In the logical network 103, nodes having a common specific prefix of IPv6 address communicate with each other by identifying others with the IPv6 address (for example, an address previously set in a node). The logical network 103 is a group of predetermined apparatuses among apparatuses connected to the LAN 101A. Apparatuses belonging to the logical network 103 can mutually communicate using a predetermined destination address. The logical network 104 is a group similar to the logical network 103 but exists outside the LAN 101A. Any type of a logical network is feasible in the present embodiment. That is, the logical networks 103 and 104 can be an Internet Protocol Version 4 (IPv4) network and an Internet Protocol Version 6 (IPv6) network. However, the logical networks 103 and 104 can be other logical networks. Furthermore, these networks can be a combination of logical networks.

A routing control apparatus 102 is configured to control Router Advertisement (RA). Further, the routing control apparatus 102 is configured to control Dynamic Host Configuration Protocol for IPv6 (DHCPv6). The RA notifies routing control information (routing information) such as a network prefix and a default router of the IPv6. The RA in the present embodiment is one example, and other protocol or a combination of other protocols can be used. The DHCPv6 notifies network setting information such as an address assignment in the IPv6, an address of a Dynamic Name System (DNS) server or a gateway server, a domain name, and a subnet mask. The DHCPv6 in the present embodiment is one example, and other protocol or a combination of other protocols can be used.

The routing control apparatus 102 provides routing control information and network setting information to the logical network 103. Further, the routing control apparatus 102 provides a logical connection between the logical network 103 and the logical network 104. The routing control apparatus 102 provides the logical connection by transmitting a Layer 2 frame on an IP network between the logical network 103 and a gateway or a router of the logical network 104. For example, the routing control apparatus 102 forms a tunnel between the logical networks 103 and 104. An apparatus in the logical network 103 communicates with an apparatus in the logical network 104 via the routing control apparatus 102 and the tunnel.

When a connected network (LAN 101A) is not a registered network, the routing control apparatus 102 restricts a notification of routing control information. Further, when the routing control apparatus 102 cannot communicate with the second network (the logical network 104), the routing control apparatus 102 restricts notification of information that is used in communication with the second network, to the first network (the logical network 103). The information used in communication with the second network is an address of a relaying apparatus (the routing control apparatus 102) in a case where an apparatus connected to the network (the logical network 103) communicates with an apparatus at the other end which is placed outside the connected network. Further, when the connected network is not the register network, the routing control apparatus 102 restricts a notification of network setting information, which is described below.

In FIG. 1, one routing control apparatus 102 is connected to the networks, but any number of apparatuses can be connected. Further, in FIG. 1, the routing control apparatus 102 is connected to one LAN 101A, but the number of the LAN is not limited to one, and the apparatus can be connected to two or more of LAN, WAN, ad hoc networks, logical networks and peer-to-peer networks. Further, the routing control apparatus 102 provides routing control information and network setting information to one logical network, but the number of the logical networks is not limited to one. The routing control apparatus 102 can provide the routing control information and network setting information to two or more logical networks.

The routing control apparatus 102 according to the present embodiment is described with reference to FIG. 2. The routing control apparatus 102 can be a personal computer (PC), workstation, a notebook PC, a palm top PC, etc. Further, the routing control apparatus 102 can be a terminal including a communication function to communicate with another routing control apparatus, for example, a television set, a game machine, a cellular phone, etc. Furthermore, the routing control apparatus 102 can be any combination of the above.

A central processing unit (CPU) 201 controls the routing control apparatus 102.

A random access memory (RAM) 202 functions as a main memory of the CPU 201, and serves as an area of an executable program, an execution area of the executable program, and a data area.

A read only memory (ROM) 203 records an operation process of the CPU 201. The ROM 203 includes a program ROM recording an operating system (OS), which is a system program to control devices in the routing control apparatus 102, and a data ROM which records information necessary for operating the routing control apparatus 102. A hard disk drive (HDD) 209 can also be used instead of the ROM 203.

A network interface (NETIF) 204 performs control to transmit data between the routing control apparatus 102 via a network, or diagnose a connecting state.

A video RAM (VRAM) 205 rasterizes an image which is displayed on a screen of a cathode ray tube (CRT) 206 and controls the display of the image. The CRT 206 shows an operating state of the routing control apparatus 102.

The CRT 206 refers to a display apparatus.

A keyboard controller (KBC) 207 controls an input signal from a keyboard (KB) 208 (i.e., external input apparatus).

The external input apparatus 208 (e.g., keyboard) receives an operation performed by a user of the routing control apparatus 102.

A storage apparatus (e.g., hard disk drive) 209 stores data such as application program or image information.

A floppy disk drive (FDD) 210 (i.e., an external input/output apparatus) is used to read the application program from a medium such as floppy disk. In addition, the FDD 210 can store and use an application program or data which is stored in the HDD 209. Any other external input/output apparatus, such as compact disc (CD) drive, which reads from a CD ROM, which would enable practice of the present invention is applicable.

An input/output bus (an address bus, a data bus, and a control bus) 200 makes connection among the above described units.

Figure 3:
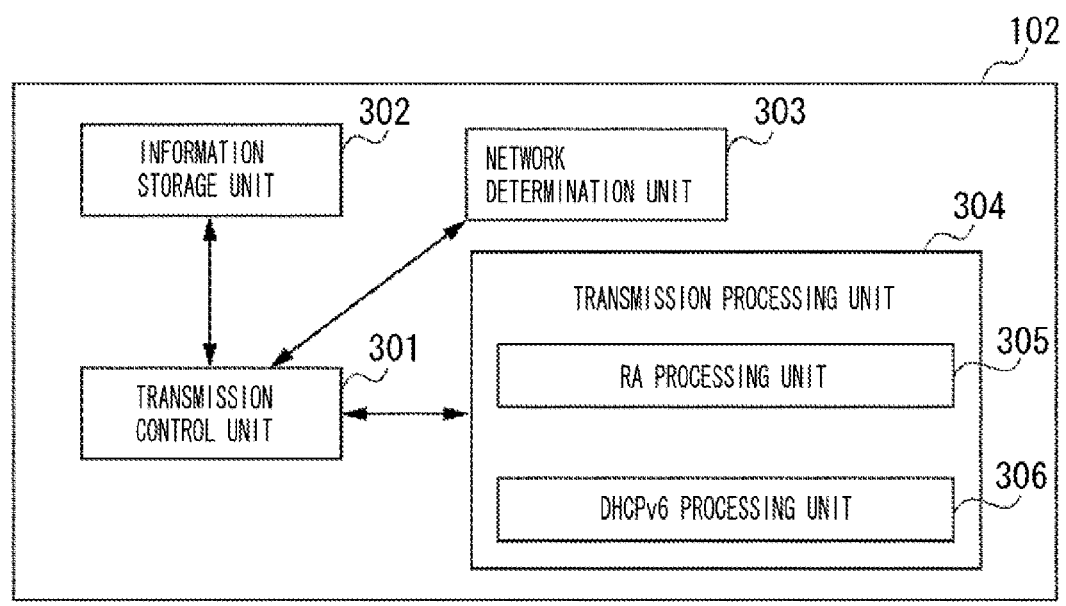
FIG. 3 illustrates an internal module configuration of a routing control apparatus according to an exemplary embodiment of the present invention.

A structure of a module in the routing control apparatus 102 according to the present embodiment is described with reference to FIG. 3.

A transmission control unit 301 performs read/write processing of network information to and from an information storage unit 302, and performs processing to control determination with respect to a network determination unit 303. The transmission control unit 301 also controls processing to control transmission with respect to a transmission processing unit 304, and registering and canceling of a network.

An information storage unit 302 stores network information and a control level of a network.

A network determination unit 303 determines whether a presently connected network is a registered network.

A transmission processing unit 304 controls an RA processing unit 305 and a DHCPv6 processing unit 306.

The RA processing unit 305 performs an RA process. The RA processing unit 305 notifies routing control information (routing information) such as a network prefix and a default router of an IPv6. While the RA is used in the present embodiment, other protocol or a combination of other protocols can also be used. The RA processing unit 305 notifies routing control information of the connected network (the logical network 103). The RA processing unit 305 notifies information used in a communication with the second network (the logical network 104), to the first network (the logical network 103). The information used in a communication with the second network (the logical network 104) is an address of a relaying apparatus (the routing control apparatus 102) in a case where an apparatus connected to the network (the logical network 103) communicates with an apparatus at the other end which is placed outside the connected network.

A DHCPv6 processing unit 306 performs response processing of the DHCPv6. The DHCPv6 processing unit 306 notifies network setting information, for example, an address assignment in an IPv6, addresses of a DNS server and a gateway server, a domain name, and a subnet mask. While the DHCPv6 is used in the present embodiment, other protocol and a combination of the other protocols can be used. The DHCPv6 processing unit 306 notifies network setting information to the connected network (the logical network 103). That is, the DHCPv6 processing unit 306 notifies an address to be assigned to an apparatus connected with a network.

Figure 2:
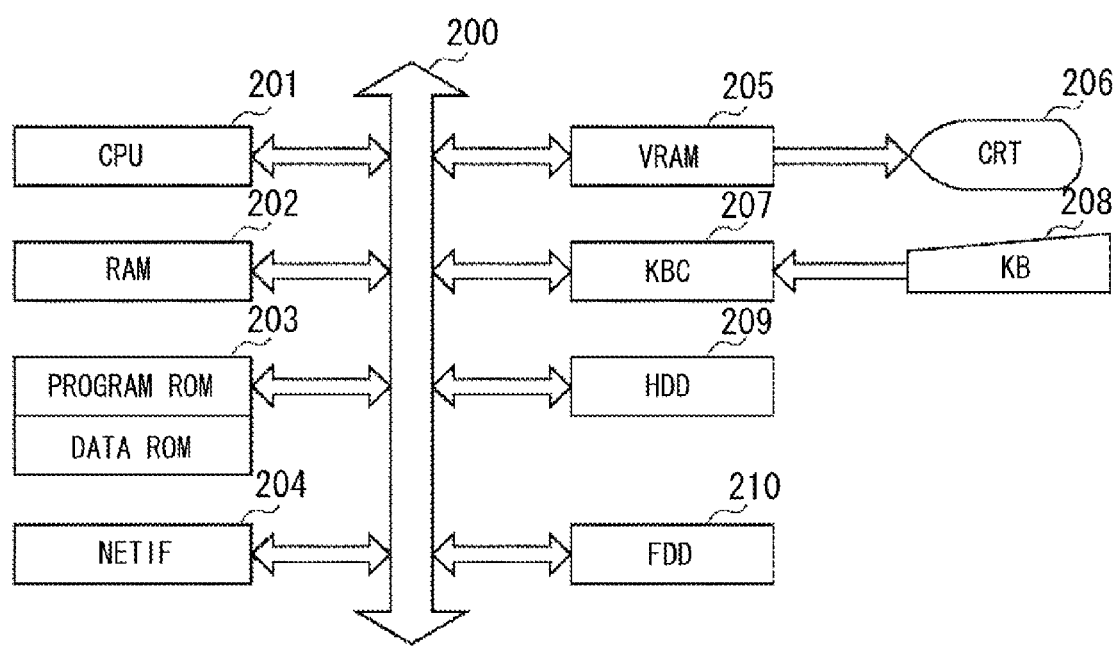
FIG. 2 is a system block diagram illustrating a case when a routing control apparatus is implemented using a personal computer (PC) according to an exemplary embodiment of the present invention.

The information storage unit 302 includes the RAM 202, the HDD 209 or the FDD 210 in FIG. 2. The CPU 201 implements the transmission control unit 301 and the network determination unit 303. The CPU 201 (the NETIF 204, and the RAM 202) implements the transmission processing unit 304, the RA processing unit 305, and the DHCPv6 processing unit 306.

FIG. 6 illustrates an example of information which the information storage unit 302 stores. A Media Access Control (MAC) address of a router of a registered network, an IP address of the router, identification information of a network, and a control level of the registered network are registered and associated with each other. Whether a network is a registered network is determined by comparing a MAC address of a router, an IP address of a router, and identification information of a network. When this information matches each other, the network is determined to be the registered network. For example, when a MAC address of a router of the connected network (the LAN 101A) is 11:22:33:44:55:66, an IP address of the router is 192.168.12.1, and network unit identification information is 255.255.255.0. Therefore, the network determination unit 303 determines that the connected network is a registered network. In this case, a control level of the registered network is "1".

In the present embodiment, the network determination unit 303 determines whether a network is a registered network by comparing the above-described information. However, the network determination unit 303 can also perform the determination by comparing a Service Set ID (SSID) in a wireless LAN and label information in a network under a label control (a label switching).

Further, a control level uses numbers in the present embodiment. However, the control level can be also described by a fine service control of an RA and a DHCPv6 using a description language such as Extensible Markup Language (XML).

An example will now be described in which the routing control apparatus 102 determines a network and controls transmission of routing control information of an RA and a DHCPv6 and network setting information.

When the routing control apparatus 102 is connected to the LAN 101A, the routing control apparatus 102 determines whether the LAN 101A is a registered network. In the present embodiment, the routing control apparatus 102 acquires a MAC address of a router, an IP address of the router, and identification information of a network unit of the connected network (the LAN 101A). The routing control apparatus 102 determines whether information of the connected LAN 101A matches with information of a registered network. According to the above determination, the routing control apparatus 102 can detect a network movement of the routing control apparatus 102 and a change of network topology connected to the routing control apparatus 102.

When the LAN 101A is not a registered network, the routing control apparatus 102 determines whether to register the network (the LAN 101A).

When the routing control apparatus 102 determines not to register the network (the LAN 101A), the routing control apparatus 102 prohibits the logical network 103 from transmitting a response to a notification request of an RA and a DHCPv6.

On the other hand, when the routing control apparatus 102 determines to register the network (the LAN 101A), the routing control apparatus 102 registers a MAC address of a router, an IP address of the router, and identification information of a network unit of the LAN 101A. Then, after a control level is determined, the routing control apparatus 102 performs processing for a case where the network is a registered network.

When the LAN 101A is a registered network, the routing control apparatus 102 confirms arrival to the logical network 104.

When the arrival to the logical network 104 is confirmed, the routing control apparatus 102 makes a determination according to the control level. The routing control apparatus 102 permits the logical network 103 to transmit all responses of an RA and a DHCPv6, or restricts transmission of the responses of an RA and a DHCPv6. For example, in the present embodiment, when the control level is "1", the routing control apparatus 102 permits a response. When the control level is "2", the routing control apparatus 102 permits only a response of a DHCPv6. In the RA, the routing control apparatus 102 notifies routing control information (routing information) such as network prefix or default data of IPv6. In the DHCPv6, the routing control apparatus 102 notifies network setting information such as an address assignment in IPv6, addresses of a DNS server and a gateway server, a domain name, and a subnet mask.

When communication with the logical network 104 is possible, i.e., when the routing control apparatus 102 confirms arrival to the logical network 104, the routing control apparatus 102 notifies the apparatus participating in the logical network 103 that they can communicate with an apparatus outside the logical network 103. In this case, the apparatus participating in the logical network 103 can communicate with an apparatus outside the logical network 103 via the routing control apparatus 102. The routing control apparatus 102 notifies by the RA (by a notification of default data) that the apparatus participating in the logical network 103 can communicate with a terminal outside the logical network 103 via the routing control apparatus 102. Further, the routing control apparatus 102 assigns an address to a terminal in the logical network 103 by the DHCPv6. When the address is assigned, the terminal in the logical network 103 can mutually communicate with a terminal in the logical network 103 without notifying default data.

When the routing control apparatus 102 cannot confirm arrival to the logical network 104, it prohibits transmission of responses of an RA and a DHCPv6 with respect to the logical network 103.

In a case where the routing control apparatus 102 is functionally connected to the LAN 101A and the logical network 103, the routing control apparatus 102 functionally includes a network interface connected to a LAN (i.e., physical network) and a virtual network interface connected to a logical network. The routing control apparatus 102 determines whether a physical network and a logical network is used, depending on one of the interfaces through which the packet (or a frame) has passed.

When the routing control apparatus 102 in FIG. 1 is connected to the LAN 101A which is a physical network, the routing control apparatus 102 transmits a frame 1000 (refer to FIG. 7) of a type which is capable of routing in a physical network via a network interface. A destination IP address in the frame 1000 is an address on a network of 192.168.12.0/24 (an address within the LAN 101A). Further, a transmission source IP address in the frame 1000 is, for example, 192.168.12.11 which is assigned to a network interface.

When the LAN 101A is a registered network and the routing control apparatus 102 confirms arrival to the logical network 104 of 2001:12aa:34bb:/64, the routing control apparatus 102 provides logical connection from the logical network 103 to the logical network 104.

The routing control apparatus 102 provides to the logical network 103 (provided that the RA is permitted), a router advertisement (RA) which comes from a router of the logical network 104. In addition, the routing control apparatus 102 transmits a Layer 2 frame to the logical network 104. Therefore, the routing control apparatus 102 sets a global address to be 2001:12aa:34bb::2 in 2001:12aa:34bb:/64, and a link local address to be FE80::2, in a transmission source node in the logical network 103. Further, the routing control apparatus 102 similarly sets a global address to be 2001:12aa:34bb::3, and a link local address to be FE80::3 in a destination node in the logical network 104, by the router advertisement (RA) from a router of the logical network 104.

When the transmission source node in the logical network 103 communicates with the destination node in the logical network 104, the destination node is recognized as a node within a same link. Therefore, the transmission source node in the logical network 103 transmits a frame 1001 (reference FIG. 7), in which the destination IP address is FE80::3 and the transmission source IP address is FE80::2, via a virtual network interface. The routing control apparatus 102 receives the frame 1001 in the virtual network interface functioning as a bridge.

Figure 7:
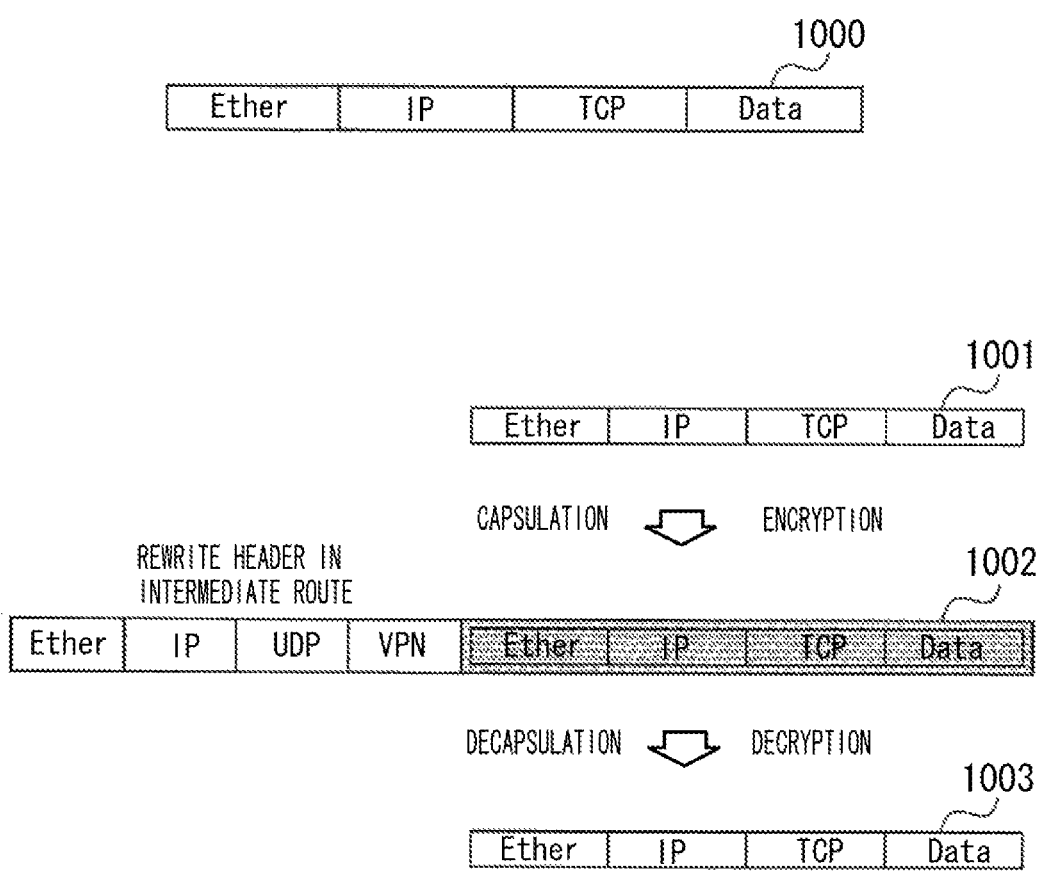
FIG. 7 is a view illustrating a frame format.

The routing control apparatus 102 encrypts the received frame, adds a virtual private network (VPN) header, an user datagram protocol (UDP) header, an IP header, and an Ether header, which are capable of routing in a physical network, and performs capsulation so as to create a frame 1002 (reference FIG. 7). In the frame 1002, the destination IP address of the added external IP header is an address of a gateway or a router of the logical network 104. Further, the transmission source IP address of the external IP header is 192.168.12.11, which is assigned to a network interface of the routing control apparatus 102.

Then, the routing control apparatus 102 transmits the frame 1002 from the network interface. Since the frame 1002 is capable of routing in a physical network, the frame 1002 is transmitted to a gateway or a router of the logical network 104 via the LAN 101A and the Internet 100. An capsulated external header portion in the 1002 type frame is rewritten to be a form adaptive to the network by a router in an intermediate route. For example, when the frame passes through a gateway having the IP address of 61.1.1.1, the transmission source address is rewritten from 192.168.12.11 to 61.1.1.1 by a NAT.

The gateway or router of the logical network 104 receives the frame 1002 via the network interface. The gateway or router of the logical network 104 detects that a VNP header is at a top of a data area, and performs decapsulation and decryption according to the VNP header. After decapsulation and decryption processing, the frame becomes a frame 1003. The gateway or router of the logical network 104 transmits the frame 1003 from the virtual network interface to the logical network 104. Then, the frame reaches a destination node of FE80::3 (its global address is 2001:12aa:34bb::3).

Thus, the routing control apparatus 102 enables mutual communication between logical network spaces using a virtual network interface.

A capsulation method is not limited to the method described in the present embodiment. For example, a TCP can be used for a protocol of a transport layer, and an IPv6 can be used for a protocol in a network layer. Further, an encryption method is not limited to the method described in the present embodiment. For example, an Advanced Encryption Standard (AES), a Data Encryption Standard (DES), and a Triple DES can also be used. An IPsec can also be used together with a protocol of a network layer, and a Secure Socket Layer (SSL) can be used together with a protocol of a transport layer.

FIG. 8 illustrates a table collecting an interface name and information of a network. A network interface corresponding to the LAN 101A which is a physical network, is eth0, in which an address is 192.168.12.11, and a network mask is 255.255.255.0. A virtual network interface corresponding to the logical network 103 is tap0, and a virtual network interface corresponding to the logical network 104 is tap1. As described above, the routing control apparatus 102 provides a connection as a bridge between tap0 and tap1.

Figure 4:
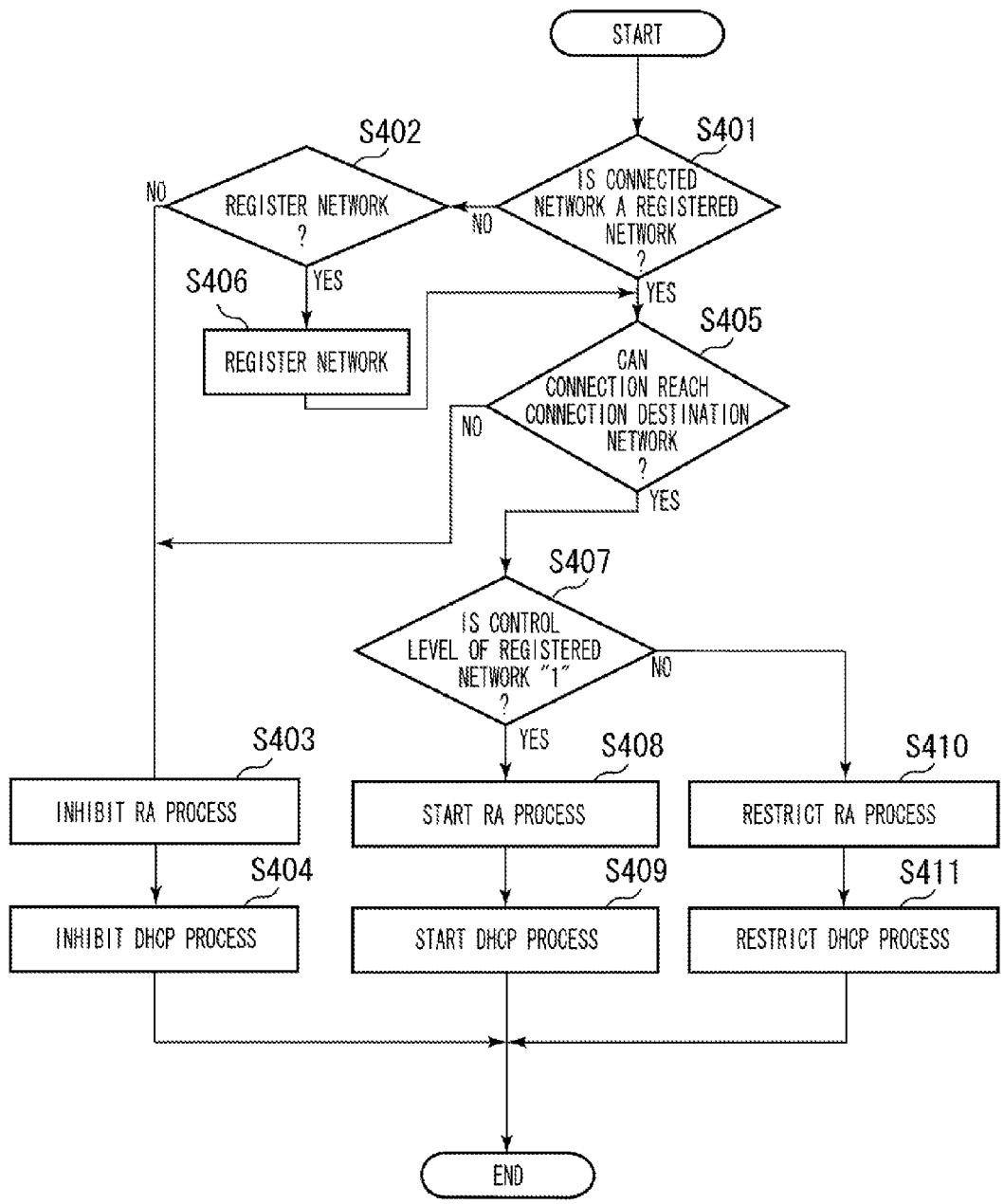
FIG. 4 illustrates a sequence for controlling transmitting of routing control information according to an exemplary embodiment of the present invention.

A sequence performed when the routing control apparatus 102 in the present embodiment is connected to a network, is described with reference to the flowchart in FIG. 4. FIG. 4 illustrates a part of a program stored in the ROM 203, the HDD 209, or FDD 210. This program is executed by, the CPU 201 where the CPU 201 reads the program from the ROM 203, the HDD 209, or the FDD 210 and executes the following processing. In executing the program, the CPU 201 functions as the transmission control unit 301, the network determination unit 303, the transmission processing unit 304 (the RA processing unit 305 and the DHCPv6 processing unit 305) in FIG. 3.

In step S401, the network determination unit 303 determines whether a connected network (LAN 101A) is a registered network. In this determination, the network determination unit 303 uses a MAC address of a router, an IP address of the router, and identification information of a network unit, which are transmitted from the transmission control unit 301 and stored in the information storage unit 302. When the network determination unit 303 determines that a connected network (LAN 101A) is a registered network (YES in step S401), the processing proceeds to step S405. When the network determination unit 303 determines that a connected network (LAN 101A) is not a registered network (NO in step S401), the processing proceeds to step S402.

In step S402, the transmission control unit 301 determines whether the connected network is to be registered as a registered network. The transmission control unit 301 can determine whether the connected network is to be registered as a registered network according to an input from the external input apparatus 208 or an instruction from an application. When the transmission control unit 301 determines the connected network is to be registered as a registered network (YES in step S402), the processing proceeds to step S406. When the transmission control unit 301 determines that the connected network is not to be registered as a registered network (NO in step S402), the processing proceeds to step S403.

In step S403, the transmission control unit 301 issues an instruction to prohibit an RA process to the transmission processing unit 304. That is, when the connected network (LAN 101A) is not a registered network, the transmission control apparatus 301 restricts a notification of routing control information by the RA. The transmission processing unit 304 issues an instruction to prohibit the RA process to the RA processing unit 305. The RA processing unit 305 prohibits the RA process with respect to the connected logical network 103 and the processing proceeds to step S404.

In step S404, the transmission control unit 301 issues an instruction to prohibit a DHCPv6 response process to the transmission processing unit 304. That is, when the connected network (LAN 101A) is not a registered network, the transmission control unit 301 restricts a notification of network setting information by the DHCPv6. The transmission processing unit 304 issues an instruction to prohibit the DHCPv6 process, to the DHCPv6 processing unit 306. The DHCPv6 processing unit 306 prohibits the DHCPv6 process with respect to the connected logical network 103, and the processing ends. The RA notifies terminals connected with the logical network 103 that the terminals can communicate with terminals outside the logical network 103 via the routing control apparatus 102. However, in this case, the above described notification is not performed. Further, the DHCPv6 process does not assign an address to the terminals in the logical network 103. Since the address is not assigned, terminals in the logical network 103 cannot communicate with other terminals even though the other terminals are placed within the logical network 103.

By issuing the prohibitions in steps S403 and S404, the transmission control unit 301 restricts a response to a notification request from an apparatus within the logical network (first network) 103. In response to the notification request, the transmission control unit 301 notifies routing control information (information used for a communication with the second network, i.e., the logical network 104) and network setting information.

In step S406, the transmission control unit 301 registers the connected network as a registered network. Then, the transmission control unit 301 causes the information storage unit 302 to store a MAC address of a router, an IP address of the router, and identification information of a network unit, and determines a control level. After the transmission control unit 301 causes the information storage unit 302 to store the control level, the processing proceeds to step S405.

In step S405, the transmission control unit 301 confirms a connection to the logical network 104. When the transmission control unit 301 confirms the connection to the logical network 104 (YES in step S405), the processing proceeds to step S407. When the transmission control unit 301 fails to connect to the logical network 104 (NO in step S405), the processing proceeds to steps S403 and S404, and the processing ends. That is, when the transmission control unit 301 cannot communicate with the second network (the logical network 104), the transmission control unit 301 restricts a notification of information used for a communication with the second network, to the first network (the logical network 103). The connection to the logical network 104 can be confirmed when the transmission control unit 301 transmits a request for confirming a connection to an apparatus connected with the logical network 104 and the connection confirmation returns. The information storage unit 302 stores an address of the apparatus connected with the logical network 104.

In step S407, the transmission control unit 301 determines a control level of the registered network. When the control level of the registered network permits all processes (all process are permitted when the control level is "1" in the present embodiment) (YES in step S407), the processing proceeds to step S408. When the control level of the registered network step-by-step permits processes (processes are step by step permitted when the control level is "2" or "3" in the present embodiment) (NO in step S407), the processing proceeds to step S410.

In step S408, the transmission control unit 301 issues an instruction to start an RA process to the transmission processing unit 304. The transmission processing unit 304 issues an instruction to start the RA to the RA processing unit 305. The RA processing unit 305 starts the RA process with respect to the connected logical network 103, and the processing proceeds to step S409. In the RA process, the RA processing unit 305 notifies information used in a communication with the second network (the logical network 104) to the first network (the logical network 103). This information is an address of a relaying apparatus (the routing control apparatus 102) which is used when an apparatus connected with the network (the logical network 103) communicates with a apparatus at the other end which is placed outside the connected network. In step S409, the transmission control unit 301 issues an instruction to start a DHCPv6 process to the transmission processing unit 304. The transmission processing unit 304 issues an instruction to start the DHCPv6 process to the DHCPv6 processing unit 306. The DHCPv6 processing unit 306 starts the DHCPv6 process with respect to the connected network 103, and the processing ends.

In the RA process, the RA processing unit 305 notifies routing control information to the connected network (the logical network 103). That is, the RA processing unit 305 notifies routing control information (routing information) such as network prefix and default data of IPv6. Further, in the DHCv6 process, the DHCPv6 processing unit 306 notifies network setting information to the connected network (the logical network 103). That is, the DHCPv6 processing unit 306 notifies network setting information such as an address assignment in IPv6, addresses of a DNS server and a gateway server, a domain name, and a subnet mask. The routing control apparatus 102 notifies the terminals connected with the logical network 103 that these terminals can communicate with terminals outside the logical network 103 via the routing control apparatus 102.

The routing control apparatus 102 notifies by the RA (by notification of default data) that the terminals connected with the logical network 103 can communicate with terminals outside the logical network 103 via the routing control apparatus 102. Further, the routing control apparatus 102 assigns an address to a terminal within the logical network 103 by the DHCPv6.

In step S410, the transmission control unit 301 issues a starting instruction to the transmission processing unit 304 according to the control level of the registered network. The starting instruction includes an instruction to restrict the RA process. That is, the transmission control unit 301 restricts a notification of routing control information. The transmission processing unit 304 issues a starting instruction which includes an instruction to restrict the RA process, to the RA processing unit 305. The RA processing unit 305 restricts the RA process with respect to the connected logical network 103 and the processing proceeds to step S411. In step S411, the transmission control unit 301 issues a starting instruction to the transmission processing unit 304 according to the control level of the registered network. The starting instruction includes an instruction to restrict the DHCPv6 process. That is, the transmission control unit 301 restricts a notification of network setting information. The transmission processing unit 304 issues a starting instruction which includes an instruction to restrict the DHCPv6 process, to the DHCPv6 processing unit 306. The DHCPv6 processing unit 306 restricts the DHCPv6 process with respect to the connected logical network 103, and the processing ends. The routing control apparatus 102 notifies by the RA (by notification of default data) that terminals connected with the logical network 103 can communicate with terminals outside the logical network 103 via the routing control apparatus 102. Further, the routing control apparatus 102 assigns an address to terminals within the logical network 103 by the DHCPv6.

Thus, the routing control apparatus 102 restricts notification according to a control level set in the connected network (LAN 101A). For example, in the case of the control level "3", the routing control apparatus 102 restricts an area in which terminals participating in the logical network 103 can communicate to within the logical network 103. In order to restrict the area in such a manner, the routing control apparatus 102 permits the DHCPv6 processing unit 306 to assign an IPV6 address for communicating with the terminals within the logical network 103. On the other hand, the routing control apparatus 102 prohibits the RA processing unit 305 from notifying routing control information (routing information), such as network prefix and default data of the IPv6. That is, the routing control apparatus 102 imposes restriction on the RA processing unit 305 in notifying information used for a communication with the second network (the logical network 104) to the first network (the logical network 103). When an address is assigned in the DHCPv6, the terminals within the logical network 103 can communicate each other within the logical network 103 without notification of default data.

Figure 5:
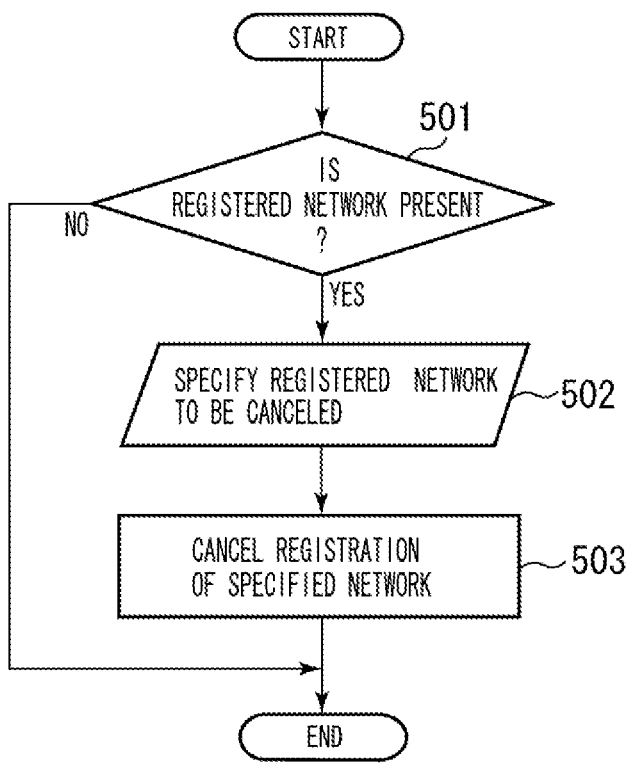
FIG. 5 illustrates a sequence for canceling a registration of a registered network according to an exemplary embodiment of the present invention.

A sequence performed when the routing control apparatus 102 according to the present embodiment cancels a registration of a registered network is described with reference to the flowchart of FIG. 5.

In step S501, the transmission control unit 301 determines whether the information storage unit 302 stores a registered network. When the registered network is stored (YES in step S501), the processing proceeds to step S502. When the registered network is not stored (NO in step S501), the processing ends.

In step S502, the transmission control unit 301 specifies a registered network to be canceled and the processing proceeds to step S503. In specifying the registered network to be canceled, a user or an application can specify a MAC address of a router registered in the information storage unit 302 using the external input apparatus 208.

In step S503, the transmission control unit 301 cancels a registration of the specified registered network and deletes information of the registered network stored in the information storage unit 302 and the processing ends.

According to the present embodiment, a user can safely connect an apparatus with a routing control function and a network setting information notifying function to a network, and can move and change a network.

For example, when an apparatus moves to a public network, for example, a hot spot, which exits outside a registered network, a wrong RA notification can be restricted by prohibiting an RA notification. Therefore, destroying or confusing a connecting environment in a public network, for example, a hot spot, can be restricted. Further, restriction can be imposed on providing routing control information about a home network to an ill-intentioned third party, or on unauthorized access to a home network.

By prohibiting a DHCPv6 response notification, transmitting wrong network setting information to a network apparatus at a movement destination so that a network connection to the apparatus becomes impossible can be avoided.

Thus, the routing control apparatus 102 can control routing control information and network setting information according to a change of a network state. Therefore, the routing control apparatus 102 can create and manage a dynamic and intelligent logical network based on a set policy or rule, as a gateway apparatus in a multiform environment, a multi-prefix environment and an overlay network environment.

The present invention can be implemented by a recording medium recording a program code of software to implement the function of the above-described embodiment, where the recording medium can be supplied to a system or an apparatus. Then, a computer (or, CPU or MPU) of the system or the apparatus reads out the program code stored in the recording medium and executes it. The program code itself read from the recording medium implements the function of the above-described embodiment, and accordingly the program code itself and the recording medium storing the program code constitute the present invention.

As the recording medium to supply a program code, a floppy disk, a hard disk, an optical disk, a magneto-optical disk, a compact disk read only memory (CD-ROM), a compact disk recordable (CD-R), a magnetic tape, a nonvolatile memory card, a read only memory (ROM), or a digital video disk (DVD), for example, can be used.

In addition, the function according to the above-described embodiment can be implemented not only by executing the program code read by the computer, but also can be implemented by the processing in which an operating system (OS), etc. carries out a part or the whole of the actual processing based on an instruction given by the program code.

Furthermore, after a program code read from a recording medium is written in a memory provided in a function expansion board inserted in a computer or a function expansion unit connected to the computer, a CPU, etc. provided in the function expansion board or the function expansion unit carries out a part or the whole of the actual processing to implement the function of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-327027 filed Dec. 4, 2006 and No. 2007-201791 filed Aug. 2, 2007, which are hereby incorporated by reference herein in their entirety.

What is claimed is:

1. A communication apparatus comprising:
a connection unit configured to connect to a first network and to connect via another network other than the first network to a second network;
a notification unit configured to notify a first apparatus on the first network connected by the connection unit of address information of a relaying apparatus used by the first apparatus for communicating with a second apparatus on the second network;
a determination unit configured to determine whether or not the second network is connected via the another network by the connection unit; and
a restriction unit configured to restrict notification by the notification unit of the address information of the relaying apparatus used by the first apparatus on the first network for communicating with the second apparatus on the second network via the another network in a case where the determination unit determines that the second network is not connected via the another network by the connection unit.

2. The communication apparatus according to claim 1, wherein the notification unit notifies the apparatus on the first network of network setting information including a subnet mask and the restriction unit restricts notification of the network setting information in a case where the second network is not connected via the another network by the connection unit.

3. The communication apparatus according to claim 2, wherein the network setting information includes address information of the first apparatus on the first network.

4. The communication apparatus according to claim 1, wherein the restriction unit restricts notification of a response including address information of a relaying apparatus in response to a notification request from the first apparatus on the first network.

5. The communication apparatus according to claim 1, wherein the restriction unit restricts notification according to a control level of the first network in a case where the determination unit determines that the second network is connected via a logical connection.

6. A method for controlling a communication apparatus connected to a first network and connected via another network other than the first network to a second network, comprising:
notifying a first apparatus on the first network of address information of a relaying apparatus used by the first apparatus for communication with a second apparatus on the second network;
determining whether or not the second network is connected via the another network; and
restricting notification of the address information of the relaying apparatus used by the first apparatus on the first network for communicating with the second apparatus on the second network via the another network in a case where the second network is not connected via the another network.

7. The method according to claim 6, further comprising:
notifying the first apparatus on the first network of network setting information including a subnet mask; and
restricting notification of the network setting information in a case where the second network is not connected via the another network.

8. The method according to claim 6, further comprising restricting notification of a response including address information of a relaying apparatus in response to a notification request from the first apparatus on the first network.

9. The method according to claim 6, further comprising restricting notification according to a control level of the physical network in a case where the second network is connected via the another network.

10. A non-transitory computer-readable storage medium storing a computer program to be executed by a computer connected to a first network and connected via another network other than the first network to a second network, the computer program comprising:
notifying a first apparatus on the first network of address information of a relaying apparatus used by the first apparatus for communicating with a second apparatus on the second network;
determining whether or not the second network is connected via the another network; and
restricting notification of the address information of the relaying apparatus used by the first apparatus on the first network for communicating with the second apparatus on the second network in a case where the second network is not connected via the another network.

11. The non-transitory computer-readable storage medium according to claim 10, wherein the computer program further comprises:
notifying the apparatus on the first network of network setting information including subnet mask; and
restricting notification of the network setting information in a case where the second network is not connected via the another network.

12. The non-transitory computer-readable storage medium according to claim 10, wherein the computer program further comprises restricting notification of a response including address information of a relaying apparatus in response to a notification request from the first apparatus on the first network.

13. The non-transitory computer-readable storage medium according to claim 10, wherein the computer program further comprises restricting notification according to a control level of the first network in a case where the second network is connected via the another network.

14. The communication apparatus according to claim 1, wherein the restriction unit restricts notification of the address information of the relaying apparatus such that the first apparatus on the first network can communicate with another apparatus on the first network and the first apparatus on the first network cannot communicate with an apparatus on the second network in a case where the control level of the first network is a first control level and the determination unit determines that the second network is connected by the connection unit, and the restriction unit does not restrict notification of the address information of the relaying apparatus such that the first apparatus on the first network can communicate with another apparatus on the first network and an apparatus on the second network in a case where the control level of the first network is a second control level higher than the first control level and the determination unit determines that the second network is connected by the connection unit.

15. The method according to claim 6, wherein the restricting step restricts notification of the address information of the relaying apparatus such that the first apparatus on the first network can communicate with another apparatus on the first network and the first apparatus on the first network cannot communicate with an apparatus on the second network in a case where the control level of the first network is a first control level and the second network is connected via the another network, and the restricting step does not restrict notification of the address information of the relaying apparatus such that the first apparatus on the first network can communicate with the another apparatus on the first network and an apparatus on the second network in a case where the control level of the first network is a second control level higher than the first control level and the second network is connected via the another network.

16. The communication apparatus according to claim 1, wherein the notification unit notifies the first apparatus on the first network of address information of the communication apparatus as address information of a relaying apparatus in a case where the second network is connected by the connection unit and the communication apparatus relays the data from the first apparatus on the first network to the second apparatus via the another network.

17. The method according to claim 6, wherein the first apparatus on the first network is notified of address information of the communication apparatus as the address information of a relaying apparatus in the notifying step in a case where the second network is not connected via the another network, and further comprising relaying the data from the first apparatus on the first network to the second apparatus on the second network via the another network.

18. The communication apparatus according to claim 1, wherein the notification unit notifies the first apparatus on a logical network formed in the first network of the address information of the relaying apparatus used by the first apparatus for communicating with the second apparatus on the logical network formed in the second network.

19. The communication apparatus according to claim 1, wherein the determination unit determines whether or not the first network connected to the connection unit is a registered network, and the restriction unit restricts the notification by the notification unit of the address information of the relaying apparatus used by the first apparatus for communicating with the second apparatus on the second network in a case where the determination unit determines that the first network is not a registered network.

20. The method according to claim 6, wherein the notification step notifies the first apparatus on a logical network formed in the first network of the address information of the relaying apparatus used By the first apparatus for communicating with the second apparatus on the logical network formed in the second network.

21. The method according to claim 6, wherein the determination step determines whether or not the first network connected to the connection unit is a registered network, and the restriction step restricts the notification by the notification unit of the address information of the relaying apparatus used by the first apparatus for communicating with the second apparatus on the second network in a case where the determination step determines that the first network is not a registered network.

22. The non-transitory computer-readable storage medium according to claim 10, wherein the notification step notifies the first apparatus on a logical network formed in the first network of the address information of the relaying apparatus used by the first apparatus for communicating with the second apparatus on the logical network formed in the second network.

23. The non-transitory computer-readable storage medium according to claim 10, wherein the determination step determines whether or not the first network connected to the connection unit is a registered network, and the restriction step restricts the notification by the notification unit of the address information of the relaying apparatus used by the first apparatus for communicating with the second apparatus on the second network in a case where the determination step determines that the first network is not a registered network.

* * * * *